May 5, 1959   J. C. COOK   2,885,633
ELECTRICAL CREVASSE DETECTOR
Filed April 8, 1957   3 Sheets-Sheet 1
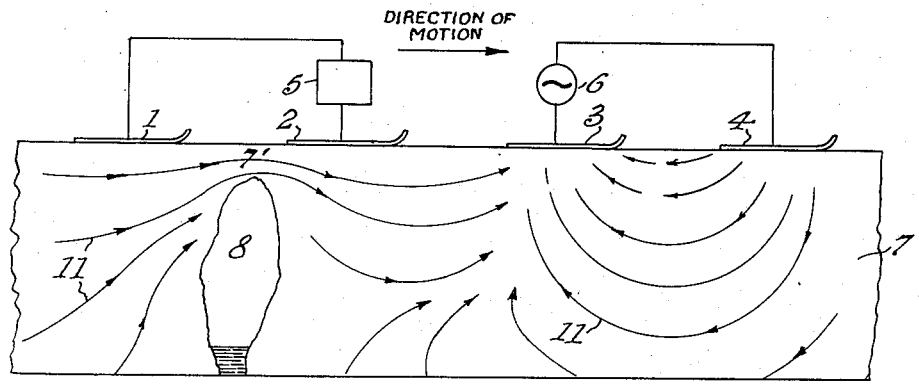
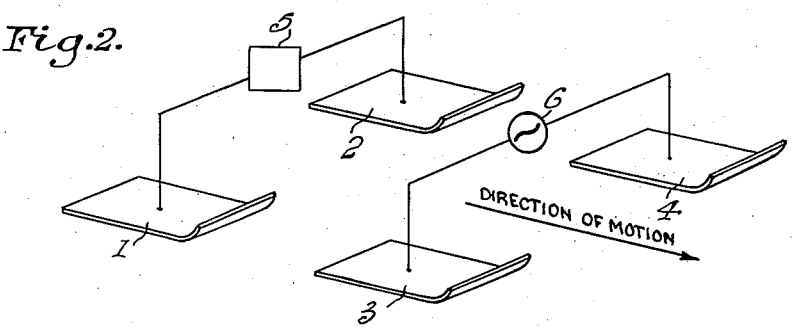
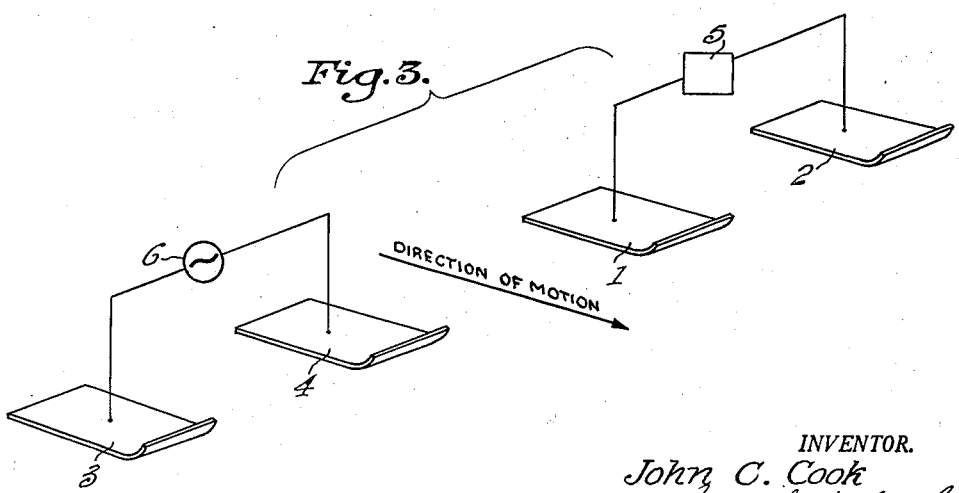
INVENTOR.
John C. Cook
BY
ATTORNEYS May 5, 1959　　　　　J. C. COOK　　　　　2,885,633
ELECTRICAL CREVASSE DETECTOR
Filed April 8, 1957　　　　　　　　　　　3 Sheets-Sheet 2
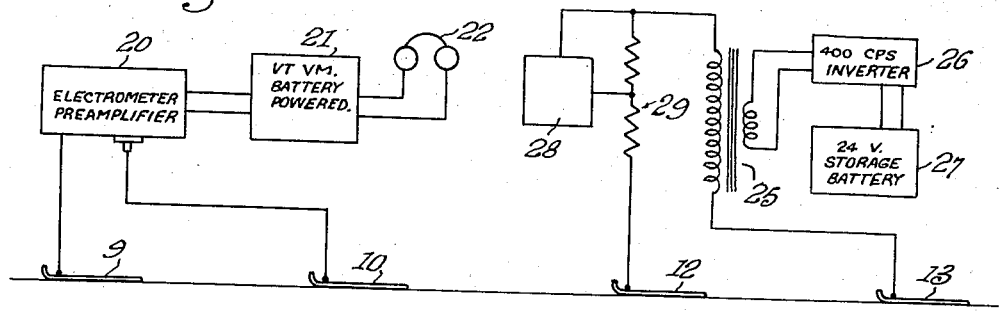
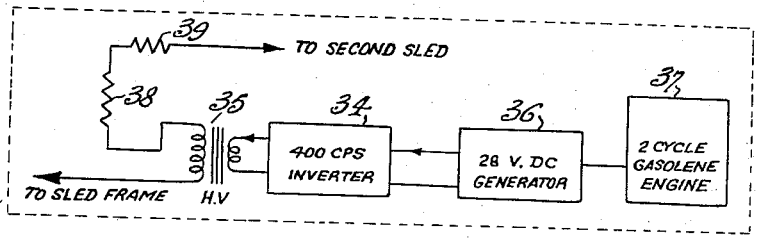
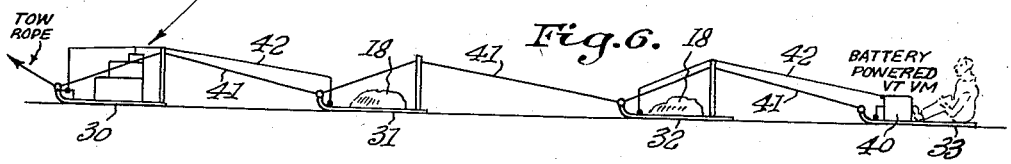
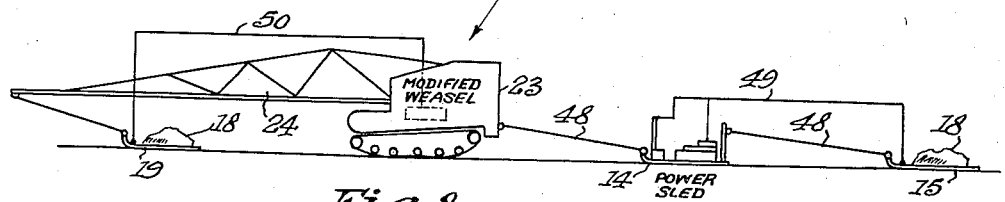
INVENTOR.
John C. Cook
BY
ATTORNEYS May 5, 1959 J. C. COOK 2,885,633
ELECTRICAL CREVASSE DETECTOR
Filed April 8, 1957 3 Sheets-Sheet 3
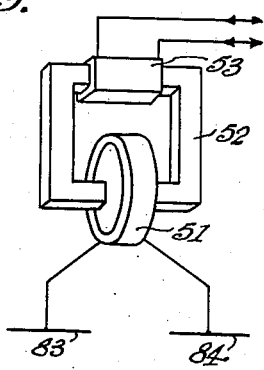
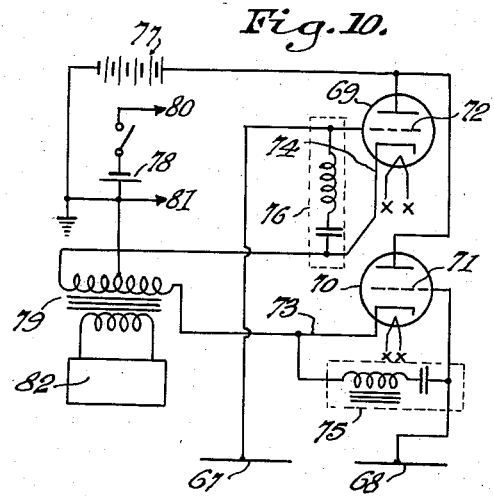
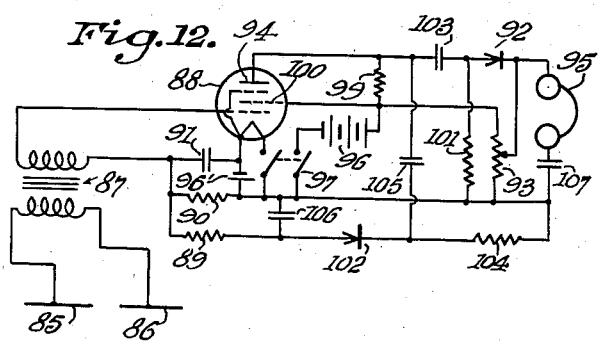
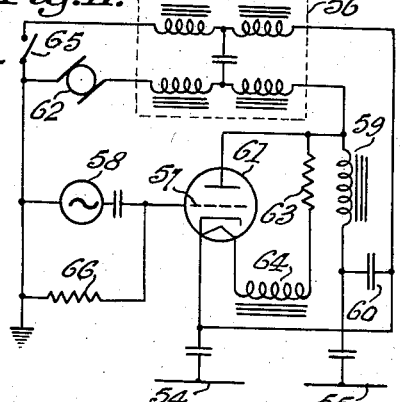
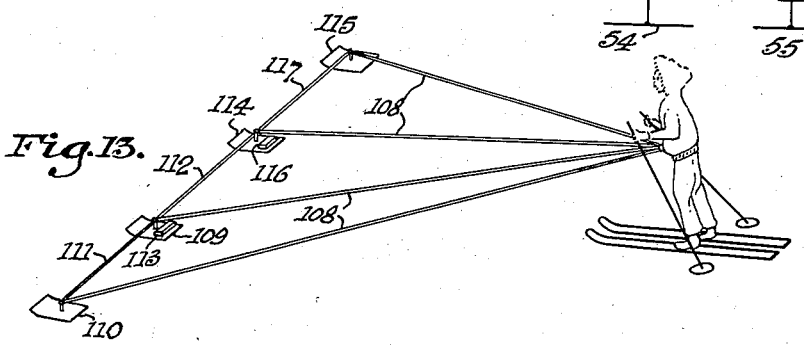
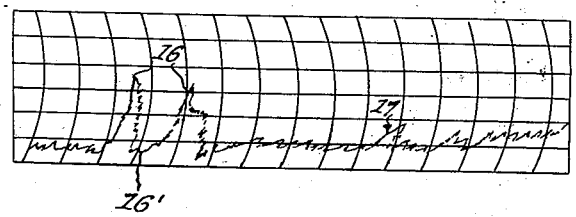
INVENTOR.
John C. Cook
BY
ATTORNEYS

United States Patent Office 2,885,633
Patented May 5, 1959

2,885,633
ELECTRICAL CREVASSE DETECTOR

John C. Cook, San Antonio, Tex., assignor to the United States of America as represented by the Secretary of the Army Application April 8, 1957, Serial No. 651,561

13 Claims. (Cl. 324—1)

The instant invention relates to an apparatus for electrically detecting flaws or volumes of inhomogeneities in structures or products made of electrically non-conducting material and more particularly for detecting crevasses in glacier ice which are concealed by bridges of drifted snow.

Surface traffic on polar glaciers encounters a serious hazard from deep crevasses concealed by drifted snow. The apparatus of the instant invention effectively provides warning of such invisible crevasses in any weather and at night.

The crevasse detector apparatus of the instant invention includes four flat-plate electrodes which are placed in contact with the glacier surface. The apparent dielectric constant of a chosen large volume of ice or firn is measured continuously by the apparatus moving over its surface. A crevasse or other large void concealed in the ice or firn locally reduces the effective dielectric constant from its usual value of 30 to 75 c.g.s. units, at low audio frequencies, to a value near unity. The apparatus locates this anomaly.

The four flat-plate electrodes of large area are arranged in a rigid pattern capable of moving as a whole over the ice surface. A source of alternating current I is connected between two current electrodes. These establish a three-dimensional pattern of current flowing in the ice. Since ice is a good insulator, this current is "displacement current," like that flowing through the dielectric of a condenser connected to an A.C. source. The reference to the three-dimensional distribution of the alternating displacement current within the dielectric medium merely refers to the three mutually perpendicular vector components of the displacement current which will exist within the ice medium.

A potential-difference-measuring device, such as an A.C. voltmeter, is connected between the two other electrodes, called the potential of signal electrodes. These detect, in effect, the current density in a surrounding volume of the ice. Any marked distortion of the current pattern by an obstruction such as might result from introduction of a crevasse near any of the electrodes, will cause a change in the voltage reading. It has been found that most crevasses produce voltmeter readings from two to twenty times as large as the "normal" signal and its fluctuations over an uncrevassed area. When the total current flow between the current electrodes is maintained constant, the voltage reading represents the "mutual capacitative reactance" of the system which depends mostly on the average permittivity of the ice near the group of electrodes; that is, its effective dielectric constant.

The four electrode system utilized in the instant disclosure is analogous to the four electrode Wenner-Gish-Rooney system of measuring effective earth conductivity described in "Exploration Geophysics" by J. J. Jakosky, chapter V, published by Trija Publishing Company, Los Angeles, California, in 1950, since the absolute properties of the medium are measurable almost independently of the electrode and circuit characteristics. The method and apparatus of the instant invention differs, however, from the Wenner-Gish-Rooney system in that an alternating dielectric displacement current field is employed rather than a field of conduction current since the ice medium is essentially a non-conductor. By the use of an electric field created by an alternating dielectric displacement current flowing in the dielectric, controlled "penetration depth" is feasible to measure the effective dielectric constant of a selected volume of ice which, in turn, indicates the presence of large voids above this "depth." Hidden crevasses may thus be detected and located externally through their influence on the accompanying magnetic field or the electric potentials on the surface of the dielectric. The apparatus of the instant invention uses four electrode sleds or vehicles pushed over the surface of the snow at velocities varying from 2 to 20 miles per hour. The sleds or vehicles are arranged several feet apart, in a suitable pattern. The mutual capacitative reactance between pairs of electrodes is measured continuously with the equipment in motion. Any large, localized increase of mutual capacitative reactance generally indicates a crevasse beneath the electrode pattern.

Earlier methods of exploring ice fields include laborious probing with steel rods and inspection of crevasse fields from aircraft under oblique illumination after a period of melting weather during which the snow bridges may sag slightly. No satisfactory reliable surface operated means of detection of crevasses has heretofore been available. Some more recent methods tried but found unsatisfactory, either in that they did not show up the crevasses or were not sufficiently reliable, or capable of quick interpretation, include measuring the intensity of a sound field at a constant distance ahead of an alternating continuous wave source as the system traversed a crevasse, seismic pulse refraction profiling, gravimeter profiles, reflection of time-modulated microwave radio beam from the under side of the crevasse bridge, profiling of field strength from a 1.7 mc. radio transmitter in traverses crossing crevasses, measuring loading effect of a glacier on radio antennas operating at 12 to 156 mc. moved over the surface at a constant height and reflection of a 500 mc. radio beam directed into the glacier at the polarizing angle, as source and receiver "look" into successive glacier areas during a traverse.

It is therefore a principal object of the present invention to provide apparatus for detecting voids in electrically non-conducting substances by measuring changes in mutual capacitative reactance between spaced electrodes on a surface of such non-conducting substances.

It is a further object of the present invention to provide surface-operated apparatus for detecting crevasses in glacial ice fields by the establishment of electric fields in a selected volume of ice by dielectric displacement currents and continuously measuring changes in capacitative reactance between pairs of electrodes on a surface of such volume of ice.

It is a further object of the present invention to provide a mobile apparatus to give advance warning by audible or visual means of the presence of voids in a dielectric substance over which the apparatus travels.

These and other objects will become apparent as the description proceeds, in which:

Fig. 1 illustrates the basic elements and principles of the crevasse detector;

Fig. 2 shows a tandem arrangement of the electrodes for the crevasse detector;

Fig. 3 shows a linear arrangement of the electrodes for the crevasse detector;

Fig. 4 shows the elements of one embodiment of the crevasse detector of the instant invention;

Fig. 5 shows the elements of another embodiment of a signal generator used in the crevasse detector of the instant invention;

Fig. 6 shows a linear arrangement of sleds used as electrodes carrying the signal generator of Fig. 5 and a detector device;

Fig. 7 shows the elements of one embodiment of a detector device;

Fig. 8 shows another linear arrangement of sleds and a boom-carrying tractor-type vehicle serving as electrodes of the crevasse detector of the instant invention;

Fig. 9 shows an isolation transformer configuration for supplying power to the input electrodes;

Fig. 10 is a circuit diagram of a detector device employing vacuum tubes and connected to a pair of electrodes;

Fig. 11 is a circuit diagram of a signal generator employing vacuum tubes and connected to a pair of electrodes;

Fig. 12 is a circuit diagram of another vacuum tube type detector device connected to a pair of electrodes;

Fig. 13 illustrates another embodiment of the principles and apparatus of the instant invention; and Fig. 14 illustrates a crevasse anomaly recording.

In order to more clearly understand the distinctions of the present invention over other methods and apparatus employing conduction currents and electromagnetic radiation, it must be understood that imperfect dielectrics when subjected to a voltage stress have (1) displacement or charging, (2) absorption and (3) conduction currents flowing. The displacement or charging current is the only current present in all dielectrics and is reversible, i.e. is recoverable as stored energy such as upon discharge of a condenser. The other currents develop the losses in dielectrics. The instant invention involves the 3-dimensional distribution of alternating displacement currents within a dielectric medium which is essentially a nonconductor of electricity. As previously mentioned, the three-dimensional distribution of the alternating displacement current within the dielectric medium refers to the three mutually perpendicular vector components of the displacement current which will exist within the volume of the ice medium. When a dielectric is placed in an electric field, as between the plates of a charged parallel plate condenser, it is believed that the molecules in an isotropic dielectric become oriented so that the lines of electric intensity joining the separated charges within the molecules lie in the direction of the field. Glacier ice is a homogeneous, isotropic dielectric material. Under the influence of the electric field, the molecules of the dielectric become oriented so that positive and negative charges on the separate molecules are adjacent, or the dielectric is said to be polarized. During the formation of the polarization, a certain amount of charge is transported through every plane element of the dielectric. This transport is called the displacement current. In the development of the theory of dielectrics, this displacement current is represented by three mutually perpendicular components in the $x$, $y$, and $z$ directions of Cartesian coordinates. While the instant apparatus may be used on non-conducting material, its application to ice and snow, both non-conductors, is particularly of interest. Local distortions of the 3-dimensional displacement current pattern, arising from internal anomalies of permittivity, effectively the dielectric constant of the substance, are detected and located externally through their influence on the accompanying magnetic field or the electric potentials on the surface of the dielectric.

Results of full-scale tests have indicated the necessity of certain basic design requirements of the apparatus when used to detect crevasse anomalies in ice fields. The electrodes 1, 2, 3 and 4 as shown in Fig. 1 should be large in area to secure low electrode reactances. Their spacings should be fixed and of the order of magnitude of the desired "working depth," that is, from 10 to 50 feet. The signal-indicating device 5 in Figs. 1, 2 and 3 should be a high input impedance voltmeter or similar device so that the capacitative decay time constant of the signal circuit is longer than one-half cycle of the applied power. The power source 6, in Figs. 1, 2 and 3, should be a constant-current source so that the signal received ($e$) is proportional to the transfer reactance $X_t = e/I$, hence the effective dielectric constant of the ice ($k$), despite variations in power-electrode reactance as the system is moved about in exploring the ice. Operating frequencies less than 1000 cycles should be used to take advantage of the best contrast in dielectric constant between ice, 7 in Fig. 1, and crevasse air, 8 in Fig. 1. The electrodes 1, 2, 3 and 4 need not be in contact with the surface to be effective, but the air-gaps should be shorter than the widths of the electrodes 1, 2, 3, and 4 for good coupling.

Before conducting field tests the approximate magnitudes of the parameters involved were developed. By mathematical derivation it can be shown that the potential ($e$) at signal electrode 1 is:

$$(1) \qquad V_1 = \frac{I}{4\pi^2 Bfk}\left(\frac{1}{a} - \frac{1}{2a}\right)$$

and that the potential ($e_2$) at signal electrode 2 is:

$$(2) \qquad V_2 = \frac{I}{4\pi^2 Bfk}\left(\frac{1}{a} - \frac{1}{3a}\right)$$

The potential difference measured is:

$$(3) \qquad e = (V_1 - V_2) = \frac{I}{2\pi^2 Bfka} \text{ volts}$$

which depends only upon the effective dielectric constant ($k$) for the ice in the vicinity of the system, providing the supply current (I), in amperes, is kept constant. The potential required at each current electrode is given by:

$$(4) \qquad V = \frac{I}{4\pi^2 Bfkr}$$

considered to be equivalent to a hemisphere of radius ($r$) buried flush with the surface of the ice, to produce an electrode current (I). The capacitative reactance per electrode is:

$$(5) \qquad x_c = v/I = 4/\pi^2 \, Bfkr \text{ ohms}$$

In the above equations:

$I$ = the total power electrode current applied by electrodes 3 and 4 as in Fig. 1.

$B = 1.11 \times 10^{-12}$.

$f$ = frequency of the applied alternating current and voltage.

$k$ = dielectric constant of the non-conducting medium such as the ice 7.

$a$ = spacing between electrodes 1, 2 and 3, 4 measured from center-to-center.

$e$ = potential at signal electrodes 1 and 2.

A set of assumed practical values of the parameters involved were:

$e = 1$ volt, $k = 30$, $f = 400$ cps., $r = 50$ cm., $a = 500$ cm., $I = 0.8$ milliampere, applied voltage $E = 60$ volts and electrode reactance $X_c = 12{,}500$ ohms.

In field tests performed, it was found that values of current and applied voltage several times the predicted values were required to obtain signals of 1 volt. The above formulas derived, therefore, must be considered nothing more than approximations. Laboratory tests however, proved it was possible, using the techniques of the instant invention, to obtain peak readings of signal voltage that were double the average normal background signal when crevasse anomalies were encountered.

Field test set-ups of early experimental equipment used were as shown in Figs. 4, 6 and 8. The stationary test arrangement shown in Fig. 4, for example, was tried on wet snow and air temperature of 38° F. and the following observations made at 400 cycles per second. The signal (e) received through electrodes 9 and 10 in Fig. 4 by means of the electrometer preamplifier 20 connected to a battery powered vacuum tube voltmeter 21, which in turn is connected to earphones 22 to provide audible indications, was 0.5 volt when the input current (I) was 1.5 milliamperes, input voltage (E) 200 volts and the electrode spacing (a) 35 feet. The electrometer preamplifier 20 consists of a special vacuum tube with associated batteries and circuit parts and presents a very high impedance to the electrodes. It has an input impedance of the order of $10^{12}$ ohms. A variety of such instruments is available commercially and will not be described in detail herein. Alternating current power at 400 cycles was transferred to electrodes 12 and 13 in this arrangement by magnetic coupling through transformer 25. The primary of transformer 25 is energized from a 400 cps. inverter 26 which in turn is energized by a 24 volt storage battery 27. A suitable current indicator 28 is connected across a part of a current limiting resistor 29 between the output side of transformer 25 and electrodes 12 and 13. The resistor 29 is of the order of 1 megohm and tends to reduce current and signal fluctuations when the electrodes travel over smooth snow. Electrode impedances were 60,000 ohms each, equivalent to a self-capacitance of 0.007 mfd. Therefore, the signal indicator 21 in Fig. 4 need not have an input impedance much greater than 1 megohm. Normal electrode motion over smooth snow causes current and signal fluctuations of at least ±10 percent. This can be reduced to ±1 percent by weighting each sled electrode with snow, as at 18 in Figs. 6 and 8, or other weights, to 10 pounds/sq. ft. to secure a relatively constant reactance as the electrodes move over bumps, etc. Use of a current regulating resistor of 1 megohm is less effective. The electrodes are effective at heights of several feet. The interconnecting wires also act as inefficient shunting electrodes, especially when in firm contact with the snow. These wires should be supported above the surface. The results obtained from operation of an arrangement such as shown in Fig. 4 were applied to set-ups such as shown in Figs. 6 and 8. Fig. 6 shows a mobile system with the power electrodes or sleds 30 and 31 and the signal electrodes or sleds 32 and 33 arranged in a line and moving along the axis thereof. The power source is that shown in Fig. 5 which is carried on the lead electrode 30 in Fig. 6. The 400 cycle power source 34 of Fig. 5 is coupled to the electrodes 30 and 31 through a transformer 35. The power source 34 is energized by a 28 volt D.C. generator 36 which is in turn driven by a gasoline engine 37. The output of transformer 35 is connected to sled 31 through a 1000 ohm resistor 38 in series with a 1.1 megohm resistor 39 for the same purpose as heretofore described in connection with Fig. 4. Electrode or sled 33 carries an observer and the signal indicator 40 which may be a vacuum tube voltmeter or other high impedance device. The electrodes 31 and 32 carry a snow load 18 for the purpose heretofore described. The sleds 30, 31, 32, and 33 are interconnected by tow ropes 41 and electrical conductors 42 between pairs of sleds 30, 31, and 32, 33. In Fig. 8 the "weasel 23" served as one signal electrode with a sled 19 towed ahead as a warning electrode by means of the boom 24. A double peaked anomaly 16 such as shown on Fig. 14 was produced by crossing a crevasse which was about 9 feet wide and 20 feet deep to water level. The first peak occurred about midway between the first and second electrodes 19 and 23, respectively, in Fig. 8, and the second peak midway between the third and fourth electrodes, 14 and 15, respectively. A distinct crevasse warning had therefore been shown when the weasel was still 10 feet from the edge of the crevasse. Other observations revealed that false high signal readings were obtained during turns and when the sleds coasted ahead of their tow-ropes on steep slopes because of the resulting alteration of electrode spacing. It is necessary therefore to disconnect the signal during turns. Destructive electrical leakage along the tow-rope between the power and signal sleds, as shown by 41 in Fig. 6, occurred during snowstorms from wetting. This caused a slow but pronounced rise of the apparent background signal. The spurious current path can be broken by inserting a glazed porcelain insulator, not shown, which must be wiped dry frequently during wet snowstorms.

The results of several hundred tests of traverses across selected crevasses indicate that the results may be evaluated in terms of two numbers:

(a) The "Alarm Factor" (f): crevasse anomaly peak voltage 16 in Fig. 14 divided by average normal signal background voltage shown generally by 17 in Fig. 14. This background signal generally indicates that the electrical circuits are functioning properly.

(b) The "Figure of Merit" (F): crevasse anomaly peak-to-trough amplitude divided by the average amplitude of spurious signal variations of similar "wavelength" character. Since the background variations were found to vary tremendously in amplitude and character from area to area on the icecap, the "Figure of Merit" (F) was necessary to indicate the distinctness of a crevasse anomaly under any background conditions. The results of the numerous tests indicate that:

(1) Four electrodes are probably necessary and are effective when arranged in a line moving along its axis as shown in Figs. 1, 4, 6 and 8 in a line moving broadside as shown in Fig. 3 and in a square (H-pattern) as shown in Fig. 2 moving perpendicular to the wires connecting the sleds of each pair. In the tests, the crevasse was crossed approximately at right angles. When in accurate alignment with the crevasse, the array of Fig. 3 gives an anomaly twice as large as an array as shown by Figs. 1, 4, 6 and 8 for short electrode spacings.

(2) Electrode spacings of from 7 to 180 feet have been used successfully. Using the axial-line arrangement as in Figs. 1, 4, 6 and 8, the anomaly is double-peaked with a low center at electrode spacings greater than 30 feet. The shortest spread giving good discrimination ($F=3$ to 6) between crevasses and background irregularities has unlike spacings of 20, 40 and 20 feet. Permutations of electrode order do not have any effect so long as a "separated spread" like that in Fig. 1 is used.

(3) The best operating frequencies (F and f greater than 2) lie below 400 cycles/sec. The optimum frequency appears to depend on electrode spacing, snow dryness and crevasse size. On wet snow, 200 c.p.s. was best ($F=f=4$). On dry snow, 60 cycles or lower sometimes gave $F \approx f > 12$. High audio frequencies always gave $F=f=1.5$.

(4) The best crevasse anomalies are obtained at sub-freezing temperatures. However, frozen, dry snow also produces frictional-electric noise at the signal sleds amounting to as much as 0.2 volt R.M.S. at 20 miles per hour for the signal circuit as shown in Fig. 7 (using a meter with a ½ megohm internal input shunt).

(5) A large void in the snow can be detected at lateral distances up to 20 feet from the path of the electrode line.

Reference is now made to Fig. 1. The electrodes 1, 2, 3, and 4 have areas of 1 to 16 square feet and are arrayed for movement in a line coincident with a common longitudinal axis of the electrodes. Normally the electrodes 1, 2, 3 and 4 are constructed as sheet metal sleds and are joined by suitable cordage or spars, so that their relative positions in the array remain constant as they are moved about on the ice 7 at speeds of from 2 to 20 miles per hour. Electrodes 3 and 4 are energized by a source 6 of alternating current (I). The resulting displacement currents in the ice 7 are represented by lines 11. Frequencies of 25 to 1000 cycles have been found satisfactory, the lower frequencies giving the best results. Currents (I) of the order of 1 milliampere R.M.S., or larger, are desirable so that the crevasse signals will clearly override the frictional electrical noise generated at electrodes 1 and 2 in sub-freezing weather. To force this much current into the ice 7 through electrodes of practical size requires that source 6 deliver an alternating voltage of the order of 1000 volts R.M.S., or higher. Electrodes 1 and 2 assume the potentials of the ice surface under their respective locations, provided they are reasonably near the surface of the ice 7. Good results have been obtained with electrodes 1 and 2 as much as two feet above the surface. The potential difference electrostatically induced upon electrodes 1 and 2 by the displacement currents 11 in the ice 7 are measured by some suitable means 5 which may be an A.C. voltmeter or other signal indicating means as hereinafter described. Alternating potential differences or signals ($e$) from 0.01 to 6.0 volts have been observed in field practice with various combinations of current (I), frequency ($f$) and electrode spacing ($a$).

As long as the input current (I) is constant, which in practice is within 5% when the electrodes are properly weighted, the signal ($e$) measured at electrodes 1 and 2 represents the mutual capacitative reactance, $e/I$, of the system, which in turn is inversely proportional to the effective mean dielectric constant ($k$) of the ice 7 in the immediate neighborhood of the electrode array. When a large void 8 exists below either the space between electrodes 1 and 2 or 3 and 4, or both, the signal voltage ($e$) may be as much as 20 times that observed on solid ice. This increase is attributed to the concentration of electric current in the snow bridge 7' of the crevasse. When a continuous recording of signal ($e$) versus position is made as an electrode array of ample spacing crosses a covered crevasse, such as 7, 7' and 8 in Fig. 1, a characteristic double-peaked pattern is produced such as 16 in Fig. 14. The central dip 16' between peaks 16 goes below the residual signal pattern 17 when partial isolation of the signal circuit from the current circuit by the crevasse occurs.

Other electrode arrangements are shown in Figs. 2 and 3. They differ from Fig. 1 only in that the array is pushed or drawn broadside rather than along its axis. This arrangement, Figs. 2 and 3, gives advance warning of the crevasses intersecting the path at a low angle. When crossing crevasses perpendicular to the path, it gives a signal pattern approximately twice as large as does the axial arrangement of Fig. 1. The broadside array of Fig. 2 is more compact for given electrode spacing than either the array shown in Fig. 1 or 3. It is not effective against crevasses which are crossed at low angles, unless the electrode spacing between the pairs 1 and 2 and 3 and 4 is made great.

Other electrode arrays may be used, providing they satisfy two criteria:

*a.* Both potential electrodes, such as 1 and 2, should not be equidistant from the current electrodes, such as 3 and 4. Otherwise, there is no residual signal, such as 17 in Fig. 14 to be affected by changes of current density in the ice.

*b.* The wire connecting electrodes 3 and 4 should be kept distant from that connecting electrodes 1 and 2. Otherwise, the large current and voltage in the current circuit will induce spurious voltages in the potential circuit by magnetic and capacitative coupling. When this false "air" signal is comparable to or larger than the residual signal 17 in Fig. 14, its variations with wire spacing obscure the desired crevasse pattern.

The requirement of decoupling applies not only to connecting wires, but to all parts of the two electrical circuits. Experience indicates that stray capacitance between the current and voltage circuits must be kept below a value of the order of 50 mmf., and leakage resistance must exceed several hundred megohms. Otherwise, the system tends to degenerate into a 3-electrode circuit, which measures merely the absolute self-reactance of the common "current-voltage electrode," and useful crevasse signals cannot be obtained.

The simplest means of insuring decoupling is that shown in Fig. 1 in which the energy source 6 is contained within electrode 3 and voltmeter 5 is contained within electrode 2 together with an observer. This arrangement is particularly convenient when electrode 2 consists of a vehicle, as in Fig. 8, in which the observer and a signal recording device may be located. Because of the required dimensions of the system and the fact that only capacitative coupling with the snow is needed, a 2-ton rubber-tracked vehicle may serve as an electrode, as in Fig. 8. The chart shown in Fig. 14 was produced in such a system.

Fig. 7 shows a satisfactory indicating arrangement which may be used in a vehicle such as 23 in Fig. 8. In this arrangement the output of the vacuum tube voltmeter 43 may be fed to a pair of earphones 44 for audible indication or through a bridge rectifier 45 to a recording milliammeter 46. The chart drive of the milliammeter 46 is driven in synchronism with the tracks of the vehicle 23 by suitable mechanical linkage, shown generally by 47. The power electrodes or sleds 14, 15, and the "weasel" 23 in Fig. 8 are interconnected by tow means 48 and electrical conductor 49 connects the power electrodes. Signal electrodes 19 and 23 are electrically interconnected as at 50 and mechanically by the boom 24.

The isolated energy source represented by 6 in Fig. 1 is a site of potential trouble under polar weather conditions. It is preferable to energize the power electrodes such as 3 and 4 in Fig. 1 from a source in the vehicle. Furthermore, when either of the electrode configurations shown in Figs. 2 and 3 is used, the vehicle cannot be used as one electrode, and the potential circuit must be electrically isolated from the vehicle to prevent the latter from shunting one electrode, virtually displacing it from its apparent position.

Two suitable methods of transferring alternating current power from vehicle to electrodes and signals from electrodes to vehicle are magnetic coupling and electron-stream modulation in a vacuum tube. Circuits incorporating these two principles are shown in Figs. 4, 5, 9, 10, 11 and 12. Transformer coupling the electrodes such as 83, 84, in Fig. 9 is successful only when the interwinding capacitances in the transformers such as shown in Fig. 9 are kept small. This can be accomplished by winding the secondary coil 51 separately, well spaced from the core 52 and the primary coil 53.

The vacuum tube power circuit for supplying energy to a pair of power electrodes 54, 55, as shown in Fig. 11, requires a filter 56 capable of passing ample direct current power in both directions, but presenting a very high impedance to the alternating current on the electrodes 54 and 55. The control grid 57 of the vacuum tube 61 is energized from the vehicle with alternating current from 58 and applies alternating current indirectly to electrodes 54 and 55. A series-resonant circuit made up of a choke 59 and condenser 60 may be added to increase the alternating voltage across the electrodes 54, 55. The direct current source 62, controlled by switch 65, supplies D.C. plate voltage to tube 61, and filament voltage through dropping resistor 63. Choke 64 provides a high impedance to electrode A.C. potentials at the operating frequency and keeps such potentials out of the plate circuit. The A.C. source 58 applies A.C. indirectly to electrodes 54, 55 through modulation of the electron stream in the tube 61 when this tube conducts. The grid 57 is connected to ground through a grid-reference resistor 66.

Fig. 10 shows a push-pull signal circuit. The potentials on the electrodes 67, 68, modulate the electron current through the electrometer-type vacuum tubes 69, 70, by means of the isolated grids 71, 72. The grids 71, 72 should be "grounded" to the cathodes 73, 74, respectively, through the impedances 75, 76, respectively, which are very high at the operating frequency. When the impedances 75, 76 are series tuned circuits, as shown, their impedance may be made relatively low at frequencies other than the operating frequency, so that they tend to bypass friction generated electrical noise from electrodes 67, 68. Plate voltage for tubes 69, 70 is supplied by battery 77 and filament voltage for the tubes is supplied by battery 78 by connecting the the terminals 80, 81 to the filaments (x—x) of tubes 69, 70. A cathode follower circuit is used to isolate a vehicle from a remote pair of signal electrodes. The cathode follower output is fed to a transformer 79 in the output of which a high impedance voltmeter 82 or comparable indicating device is connected.

Fig. 12 shows a wiring diagram of an aural-indication circuit. The signal from electrodes 85, 86 is passed through isolating transformer 87 to a remote cutoff amplifier pentode 88. Inverse D.C. feedback from the plate 94 of tube 88 provides automatic volume control with a time constant of the order of 30 seconds determined by resistor 90 and condenser 91, to compensate for the normal variations in residual signal level from area to area. The bias on diode 92 is manually adjusted by a potentiometer 93 until none of the amplified residual signal appearing at the plate 94 of tube 88 is heard in the headphones 95. When a crevasse is encountered, the suddenly increased signal overcomes the bias and is heard as a loud, temporary warning in the otherwise silent headphones 95. The battery 96 supplies plate voltage to tube 88 through resistor 99 and to the screen grid 100 of tube 88. Filament voltage for the tube 88 is provided by battery 96'. Both batteries 96 and 96' are controlled by a switch 97. The dry batteries may be carried inside the observer's clothing to make them operative despite the polar cold. Resistor 101 supplies bias voltage to the rear of diode 92 without shunting the output signal appreciably. Resistor 89 and condensers 106 and 91 together act as a filter to delay the response of the automatic-volume-control circuit, thus eliminating any response to short-lived signal peaks such as those from friction-electrical noise. Condenser 103 isolates the plate voltage of tube 88 from the voltage applied to the diode 92 by the battery 96 and voltage divider 93. Resistor 104 provides a recharge path for condenser 105. Condenser 103 is across the output of tube 88 and when the energy in this condenser, received upon conduction of tube 88, which is controlled by the signal applied to the grid, exceeds the bias applied to diode 92 a signal is heard in the headphones 95. Diode 102 provides automatic-volume-control bias voltage to the grid of tube 88. Condenser 107 protects the headphones 95 from high voltage D.C. and prevents loss of the bias voltage applied to diode 92 by conduction through the headphones.

The use of isolating circuits, such as those shown in Figs. 9, 10, 11 and 12 permits all the electrodes to be pushed ahead of a vehicle, yet consolidates energy sources, controls and signal indications in the vehicle. Other variations within the scope of the instant invention may be used. For example, Fig. 13 shows another embodiment wherein a crevasse detector may be operated by a man on skis. Such a device must permit the free use of the explorer's hands and eyes and must be light in weight. The arrangement shown in Fig. 13 employs simple spars 108 for pushing and steering joined to a chest harness, not shown. A miniature storage battery powered alternator, represented by 113, within the electrode 109, connected to electrode 110 through connection 111, generates the operating current. Aural means of crevasse indication may be provided which may consist simply of sensitive headphones, not shown, connected to electrodes 114, 115, by means of a decoupling transformer, represented by 116, of the type shown in Fig. 9. Power electrodes 110, 113, are joined to signal electrodes 114, 115, by a non-conducting member 112. Signal electrodes 114, 115, are connected to a decoupling transformer by means of a conductor such as 117.

Having thus described my invention, what I claim as new and wish to secure by United States Letters Patent is:

1. Apparatus for detecting sub-surface voids in electrically non-conducting material comprising a plurality of pairs of electrodes adjacent one surface of a non-conducting material, adjacent pairs of said electrodes cooperating with the non-conducting material to form therewith a capacitative circuit, alternating current generating means connected to a first pair of electrodes for producing a displacement current flow within the non-conducting material, a second pair of electrodes arranged in a pattern corresponding to that of said first pair and spaced from said first pair, potential indicating means connected to said second pair of electrodes, the displacement current producing a signal of predetermined character in a homogeneous volume of non-conducting material related to the mutual capacitative reactance of said homogeneous volume of non-conducting material, said potential indicating means being responsive to changes in the signal of predetermined character corresponding to changes in the mutual capacitative reactance of the capacitative circuit produced by voids in the non-conducting material upon establishment of an electric field therein by the displacement currents flowing in the non-conducting material upon application of a voltage stress thereto by said alternating current generating means and movement of said pairs of electrodes over said non-conducting material.

2. Apparatus for detecting sub-surface voids in dielectric material comprising a plurality of pairs of plane-surfaced electrodes adjacent one surface of a dielectric material, adjacent pairs of said electrodes cooperating with the dielectric material to form therewith a capacitative circuit, a first pair of plane-surfaced electrodes arranged in a predetermined pattern having an alternating current generating means connected thereto for applying a voltage stress to the dielectric material to establish a displacement current flow in the material, a second pair of plane-surfaced electrodes arranged in a pattern corresponding to that of said first pair of electrodes, means connected to said second pair of electrodes responsive to changes in the capacitative reactance of the capacitative circuit by voids in the dielectric material creating distortions in the pattern of such displacement currents flowing in the dielectric material for indicating the presence of such voids as said first and second pairs of electrodes are simultaneously moved over the surface of the dielectric material.

3. Apparatus as recited in claim 2 wherein said first and second pairs of plane-surfaced electrodes are arranged in tandem parallel to the direction of travel of said electrodes.

4. Apparatus as recited in claim 2 wherein said first and second pairs of plane-surfaced electrodes are aligned in a direction normal to the direction of travel of said first and second pairs of electrodes.

5. Apparatus as recited in claim 2 wherein said first and second pairs of plane-surfaced electrodes are aligned in a direction parallel to the direction of travel of said first and second pairs of electrodes.

6. Apparatus as recited in claim 2 wherein at least one of said pairs of electrodes includes means for connecting driving means to move said pairs of electrodes over the surface of the dielectric material.

7. Apparatus for detecting sub-surface voids in dielectric material comprising a plurality of pairs of electrodes adjacent one surface of a dielectric material, adjacent pairs of said electrodes cooperating with the dielectric medium to form therewith a capacitative circuit, means for generating alternating currents including electromagnetic means coupling a first pair of said electrodes arranged in a predetermined pattern to said alternating current generating means for applying a voltage stress to the dielectric material to establish a displacement current flow in the material, a second pair of electrodes arranged in a pattern corresponding to that of said first pair of electrodes, means connected to said second pair of electrodes responsive to changes in the capacitative reactance of the capacitative circuit by voids in the dielectric material creating distortions in the pattern of the displacement currents flowing in the dielectric material for indicating the presence of such voids as said first and second pairs of electrodes are simultaneously moved over the surface of the dielectric material.

8. Apparatus for detecting sub-surface voids in dielectric material comprising a plurality of pairs of electrodes adjacent one surface of a dielectric material, adjacent pairs of said electrodes cooperating with the dielectric material to form therewith a capacitative circuit, electronic alternating current generating means including signal input means for controlling the electron flow in said electronic alternating current generating means connected to a first pair of said electrodes arranged in a predetermined pattern for applying a voltage stress to the dielectric material to establish a displacement current flow in the material, a second pair of electrodes arranged in a pattern corresponding to that of said first pair of electrodes, means connected to said second pair of electrodes responsive to changes in the capacitative reactance of the capacitative circuit by voids in the dielectric material creating distortions in the pattern of the displacement currents flowing in the dielectric material for indicating the presence of such voids as said first and second pairs of electrodes are simultaneously moved over the surface of the dielectric material.

9. Apparatus as recited in claim 8 wherein said means responsive to changes in the capacitative reactance of the capacitative circuit includes biased electronic means coupled to said second pair of electrodes electrically and means connected in the output of said biased electronic means for audibly signaling the presence of voids in the dielectric material as said first and second pairs of electrodes simultaneously move over the surface of the dielectric material.

10. Apparatus as recited in claim 8 wherein said means responsive to changes in the capacitative reactance of the capacitative circuit includes electronic means arranged in push-pull configuration electrically connected to said second pair of electrodes and means connected to said electronic means for indicating the presence of voids in the dielectric material as said first and second pairs of electrodes simultaneously move over the surface of the dielectric material.

11. Apparatus for detecting sub-surface voids in dielectric material comprising a plurality of pairs of electrodes adjacent one surface of a dielectric material, adjacent pairs of said electrons cooperating with the dielectric material to form therewith a capacitative circuit, a first pair of electrodes arranged in a predetermined pattern having an alternating current generating means connected thereto for applying a voltage stress to the dielectric material to establish a displacement current flow in the dielectric material, a second pair of electrodes arranged in a pattern corresponding to that of said first pair of electrodes, signaling means including simultaneously actuated audible and visual indicators connected to said second pair of electrodes, said signaling means responsive to changes in the capacitative reactance of the capacitative circuit by voids in the dielectric material creating distortions in the pattern of such displacement currents flowing in the dielectric material for indicating the presence of such voids as said first and second pairs of electrodes are simultaneously moved over the surface of the dielectric material.

12. Apparatus as recited in claim 11 wherein said signaling means includes a high impedance electrical indicating means connected to said second pair of electrodes, transducer means and alternating current rectifying means connected in parallel to the output of said high impedance indicating means, signal recording means connected to the output of said rectifying means and means interconnecting said signal recording means and said first and second pairs of electrodes for recording signal variations concurrently with the travel of said first and second pairs of electrodes over the dielectric material.

13. Apparatus for detecting sub-surface voids in dielectric material comprising a plurality of pairs of electrodes adjacent one surface of a dielectric material, adjacent pairs of said electrodes cooperating with the dielectric material to form therewith a capacitative circuit, a first pair of said electrodes aligned in a direction normal to the direction of travel of said electrodes, alternating current generating means connected to said first pair of electrodes for applying a voltage stress to the dielectric material to establish a displacement current flow in the material, a second pair of electrodes aligned with said first pair of electrodes on a common axis normal to the direction of travel of said electrodes, non-conducting means interconnecting said first and second pairs of electrodes, means connected to said second pair of electrodes responsive to changes in the capacitative reactance of the capacitative circuit by voids in the dielectric material creating distortions in the pattern of such displacement currents flowing in the dielectric material for indicating the presence of such voids and means rigidly interconnecting said first and second pairs of electrodes to a harness for simultaneous motion of said pairs of electrodes over the surface of the dielectric material by a single driving force connected to said harness.

References Cited in the file of this patent

UNITED STATES PATENTS

| | | |
|---|---|---|
| 2,162,086 | Jakosky | June 13, 1939 |
| 2,167,950 | Jakosky | Aug. 1, 1939 |